(12) United States Patent
Ridaura Ayats (10) Patent No.: US 11,052,362 B2
(45) Date of Patent: Jul. 6, 2021

(54) DEVICE FOR SPHERIFICATION OF A LIQUID

(71) Applicant: Kimi Ridaura Ayats, Blanes (ES)

(72) Inventor: Kimi Ridaura Ayats, Blanes (ES)

( * ) Notice: Subject to any disclaimer, the term of this patent is extended or adjusted under 35 U.S.C. 154(b) by 0 days.

(21) Appl. No.: 16/472,119

(22) PCT Filed: Dec. 21, 2017

(86) PCT No.: PCT/ES2017/070840
§ 371 (c)(1),
(2) Date: Jun. 20, 2019

(87) PCT Pub. No.: WO2018/115563
PCT Pub. Date: Jun. 28, 2018

(65) Prior Publication Data
US 2020/0114324 A1 Apr. 16, 2020

(30) Foreign Application Priority Data

Dec. 23, 2016 (ES) .............................. ES201631680

(51) Int. Cl.
*B01J 2/06* (2006.01)
*A23P 10/30* (2016.01)
*B01J 2/26* (2006.01)

(52) U.S. Cl.
CPC ................. *B01J 2/06* (2013.01); *A23P 10/30* (2016.08); *B01J 2/26* (2013.01)

(58) Field of Classification Search
CPC ............. C01B 17/0237; B01F 15/0217; B01F 15/0218
See application file for complete search history.

(56) References Cited

U.S. PATENT DOCUMENTS

| | | | |
|---|---|---|---|
| 4,481,157 A | 11/1984 | Morishita et al. | |
| 5,139,783 A | 8/1992 | Handjani et al. | |
| 5,204,111 A | 4/1993 | Handjani et al. | |
| 5,629,187 A | 5/1997 | Ors et al. | |

(Continued)

FOREIGN PATENT DOCUMENTS

| | | |
|---|---|---|
| ES | 2 374 046 A1 | 2/2012 |
| FR | 2823137 A1 | 10/2002 |

(Continued)

OTHER PUBLICATIONS

Translation of Moser (Year: 2001).*

(Continued)

*Primary Examiner* — Marc C Howell
*Assistant Examiner* — John J Derusso
(74) *Attorney, Agent, or Firm* — Merchant & Gould P.C.

(57) ABSTRACT

A device for spherification of a liquid includes a first device for storing a first liquid; and a spherification tank for storing a second liquid, arranged so that a dripper or entry funnel controls a level of the second liquid in the spherification tank. A device meters the first liquid coming from the first tank into the spherification tank. An extraction device extracts spheres generated in the spherification tank as a result of the metering. The extraction device includes a worm screw located in the spherification tank, the worm screw being arranged at an angle to the level, and a motor for rotating the worm screw.

9 Claims, 6 Drawing Sheets (56) References Cited

U.S. PATENT DOCUMENTS

| | | | |
|---|---|---|---|
| 5,801,453 A * | 9/1998 | Guimont | B01J 2/06 |
| | | | 264/3.5 |
| 2012/0177727 A1 | 7/2012 | Andersen et al. | |
| 2013/0251862 A1* | 9/2013 | Short | A23L 29/20 |
| | | | 426/231 |
| 2017/0326760 A1* | 11/2017 | Schmidt | B29B 9/10 |
| 2019/0184357 A1* | 6/2019 | Foglio Bonda | B01J 13/14 |

FOREIGN PATENT DOCUMENTS

| | | | | |
|---|---|---|---|---|
| FR | 2836398 A1 * | 8/2003 | | B01J 2/06 |
| JP | S62-176536 A | 8/1987 | | |
| WO | WO-0137981 A1 * | 5/2001 | | A23L 3/375 |
| WO | 2013/020832 A2 | 2/2013 | | |

OTHER PUBLICATIONS

Translation of Kowalewski (Year: 2003).*
Translation of Ramirez Fajardo (Year: 2012).*
International Search Report and Written Opinion of the International Searching Authority for International Patent Application No. PCT/ES2017/070840 dated Apr. 20, 2018, 12 pages.
Supplementary European Search Report for European Patent Application No. 17883307 (dated Jun. 29, 2020).

\* cited by examiner

DEVICE FOR SPHERIFICATION OF A LIQUID

This application is a National Stage Application of PCT/ES2017/070840, filed Dec. 21, 2017, which claims the benefit of priority to Spanish Patent Application No. P 201631680, filed Dec. 23, 2016, which applications are incorporated herein by reference. To the extent appropriate, a claim of priority is made to each of the above-disclosed applications.

BACKGROUND OF THE INVENTION

The present invention relates to a device for producing edible spheres from liquids. The device allows the process of reverse and direct spherification to be carried out on a domestic level.

SUMMARY OF THE INVENTION

The prior art relevant to this patent does not consider a domestic device for inverse spherification, as the only method that was considered was a manual or industrial process.

The technique of spherification is basically used in the culinary industry, although it is also used in the cosmetics and pharmaceutical industries. It can be defined as the creation of a solid membrane that contains a liquid within the same.

Spherification can be divided into two types: direct and reverse spherification. In direct spherification, the sphere is produced by gelification from the exterior to the interior, meaning that the spheres formed may end up being entirely made up of gel. In reverse spherification, the process of gelification of liquid occurs towards the exterior, such that an exterior layer of gel is formed which occludes liquid in its interior.

The formation of spheres is based on contact between a calcium salt and alginate. In reverse spherification, the calcium salt is contained in the liquid for spherification and the alginate is contained in water in which the liquid containing the calcium salt is submerged.

In order to perform reverse spherification, the input liquid has to contain calcium ions (e.g. by adding calcium chloride) which will form spheres when they react with alginate mixed in water. It may therefore be necessary to add these salts to both the liquid to be spherified and the water. If the input liquid to be spherified already contains calcium, it is not necessary to add a calcium salt to the same.

Variables which affect the process and the final results are the density of the liquid and the pH of the mixture.

The device according to the present invention allows for reverse spherification to be carried out at a domestic level.

The device for shaping spheres comprises a first container that may contain, for example, the input liquid that we want to spherify and a spherification tank for forming the spheres. It may also comprise an additional container having feed-water.

More specifically, the present invention describes a device for spherifying liquids, comprising:
 a first storage tank of a first liquid,
 a second tank for storing a second liquid arranged in such a way that a dripper or entry funnel defines a level of the second liquid in the spherification tank,
 a device for dispensing the first liquid coming from the first tank into the spherification tank,
 a device for extracting the spheres which are generated in the spherification tank as a result of the dispensation, in which the extraction device comprises a worm screw located in the spherification tank, which worm screw is arranged at an angle to said level, and motor means for rotating the worm screw.

The angled worm screw allows for the automatic extraction of the spheres with total control over the reaction time and without damaging the spheres. The blade of the worm screw sweeps the spheres along as they form until they are brought to the surface of the level of the liquid in the spherification tank.

The basic configuration of the invention is valid for carrying out direct and/or reverse spherification.

Preferably, the worm screw comprises a receiving element having a concave entry point for receiving the first liquid in its interior.

Preferably, the receiving element is parallel to the level of the liquid when it is in the vertical axis of said dispensing device of the first liquid. This ensures that the liquid to be spherified is received correctly in the receiving area.

Advantageously, the receiving element is fixed to the worm screw, without the possibility of movement with respect to the latter.

More preferably, the receiving element remains fixed to the central axis of the worm screw.

In a particularly preferable use of the device, the device additionally comprises:
 a dispensing pump for the first liquid,
 a cap located in the first tank having a dispensing system for calcium salts, thickeners and stabilisers,
 a dispensing system for alginate powder connected to the second tank.

Preferably, the dispensing pump for the first liquid is in the outlet conduit of the first tank.

More preferably, the dispensing system for alginate powder comprises a hopper, a worm screw and a capacitance sensor.

A pH sensor and a bypass, the opening of which is controlled by the pH sensor at the outlet of the first tank, may be used. For example, a pH sensor for the first liquid and a return bypass to the first tank having a valve controlled by said pH sensor are arranged between the first tank and the spherification tank.

An alginate dispensing system or dispenser can be used in the water tank, while a cap having multiple dispensers is used in the first tank. These can dispense, for example, calcium chloride, calcium gluconate and sodium citrate (both to stabilise the pH), xanthan gum (to achieve the ideal density) and another dispenser can also be used to add a food stabiliser if it is needed.

When in the present invention reference is made to the input liquid or first liquid, this may be any liquid. If the liquid is food, it can be, for example, fruit juice, wine, alcoholic drinks, sauces, creams, etc.

The input tanks, both for water and the liquid to be spherified, may comprise a magnetic mixer.

The addition of thickeners facilitates the formation of spheres in some input liquids.

BRIEF DESCRIPTION OF THE DRAWINGS

To aid understanding, explanatory yet non-limiting drawings are included of an embodiment of the apparatus of the present invention.

DETAILED DESCRIPTION OF THE PREFERRED EMBODIMENTS

In the example shown, the functioning is illustrated for the case of reverse spherification. In the case of direct spherification, the contents and/or arrangement of the dispensers should be changed, while the rest of the device can be identical.

Figure 1:
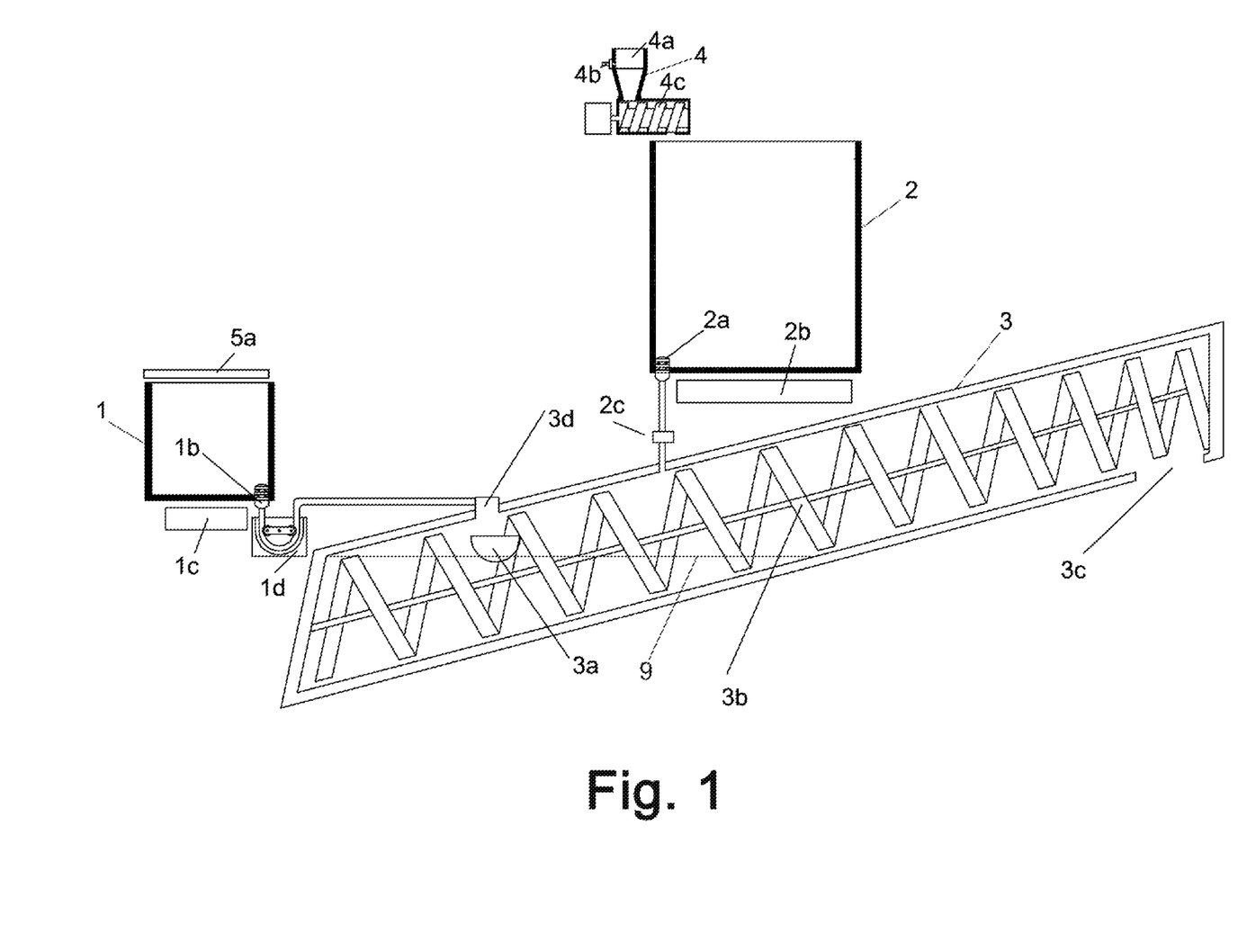
FIG. 1 is a schematic view of the components of an embodiment of a device according to the present invention, in which the internal parts of the different components are shown.

The spherification apparatus shown in the drawings comprises a water tank -2- or second tank and a first tank -1-. Furthermore, it comprises a formation tank or spherification tank -3- in which spherification occurs.

In the case of reverse spherification, water is introduced into the water tank -2- and the liquid that we want to spherify into the first tank -1-. Said tanks -1- and -2- are removable and easy to clean.

The mixing system for the water tank having alginate and the liquid to be spherified having the rest of the salt comprises magnetic mixers -1c- and -2b-.

Figure 6:
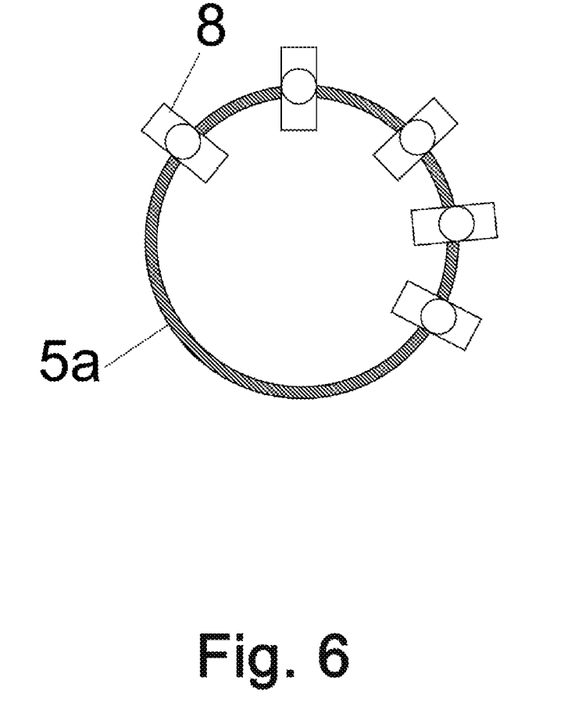
FIG. 6 is a view from above of the cap of dispensers comprised in the first tank from FIG. 1 and FIG. 2.

Once the liquid to be spherified has been introduced, the relevant programme (selected recipe book) will be introduced by means of the device controller. The domestic spherification apparatus will dispense the estimated weight in grams of each component (according to the recipe), of both calcium chloride and thickener, and the correct ratio of pH buffer by means of the cap -5a- powder dispenser. These quantities and ratios can be programmed to be introduced in advance. There is also an option for the device to repeat dispensing until the correct data is obtained, for example, pH, as it is the most sensitive measurement to be taken into account.

The first tank or container -1- comprises a cap -5a- having five dispensing nozzles -8- (FIG. 6) that dispense via a worm screw which is controlled electronically. Two dispensers are used to balance the pH, another is for the thickener, another for the calcium chloride, and another provides the option of adding a food stabiliser for some recipes.

Figure 3:
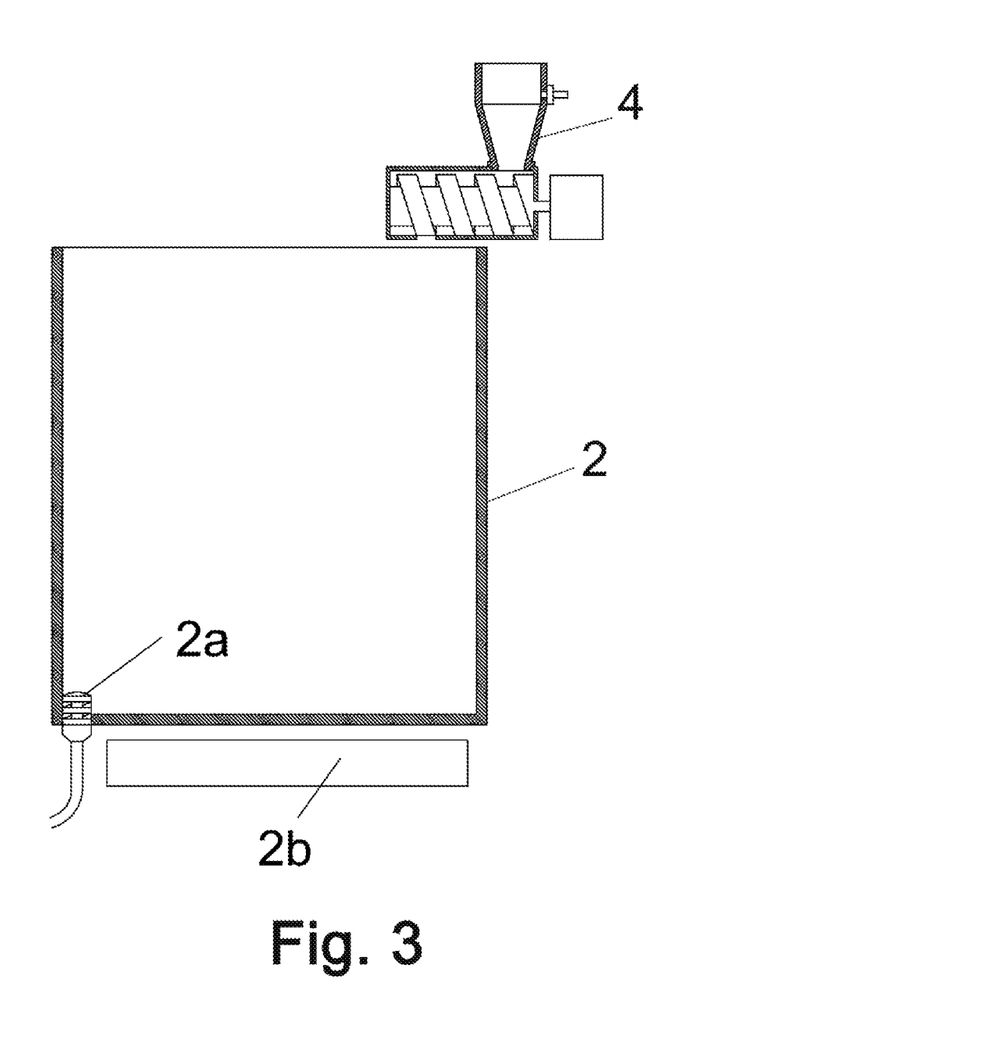
FIG. 3 is a detailed view of the water tank having a dispenser.

In the second tank -2-, the tank for water, the apparatus dispenses the alginate in the proportion necessary via the alginate dispenser -4-.

Figure 4:
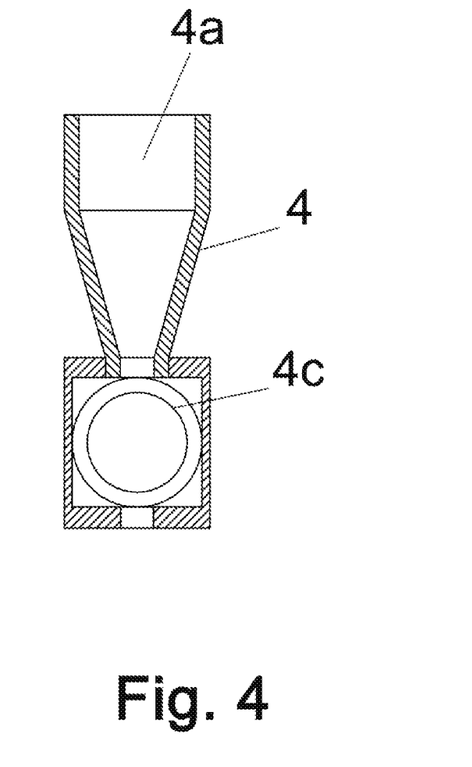
FIG. 4 is a cross-section of the dispenser used in the tank from FIG. 3.

The alginate dispenser -4- comprises a hopper 4a, a capacitance sensor 4b, and a worm screw or feeder screw -4c-, which is controlled by means of the number of rotations of the screw, with the weight in grams of each rotation being calibrated and programmed.

Figure 5:
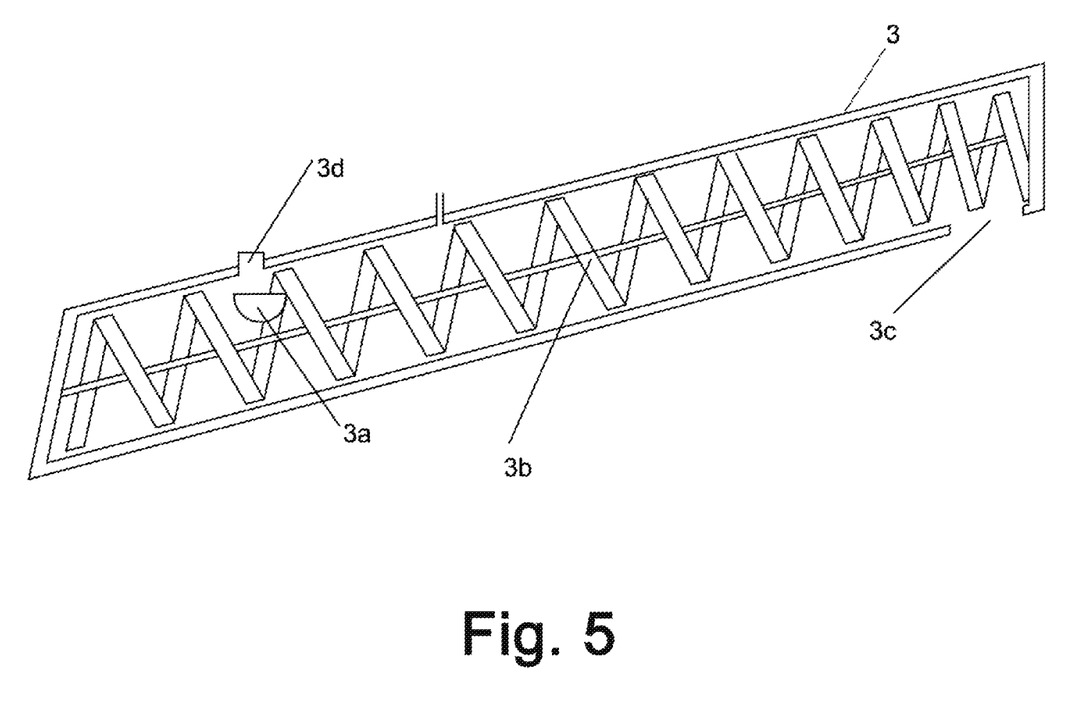
FIG. 5 is a detailed view of the mixing tank having a worm screw for extracting formed spheres.

In the first tank -1- and in the water tank -2-, there are spring valves -1b- and -2a-, one for each container, which lead to the formation tank -3-. The formation or spherification tank -3- comprises a dispensing device or dripper -3d- and a helical worm screw -3b- for extracting spheres to the outlet -3c-. The dripper can be composed of a simple liquid inlet.

Figure 2:
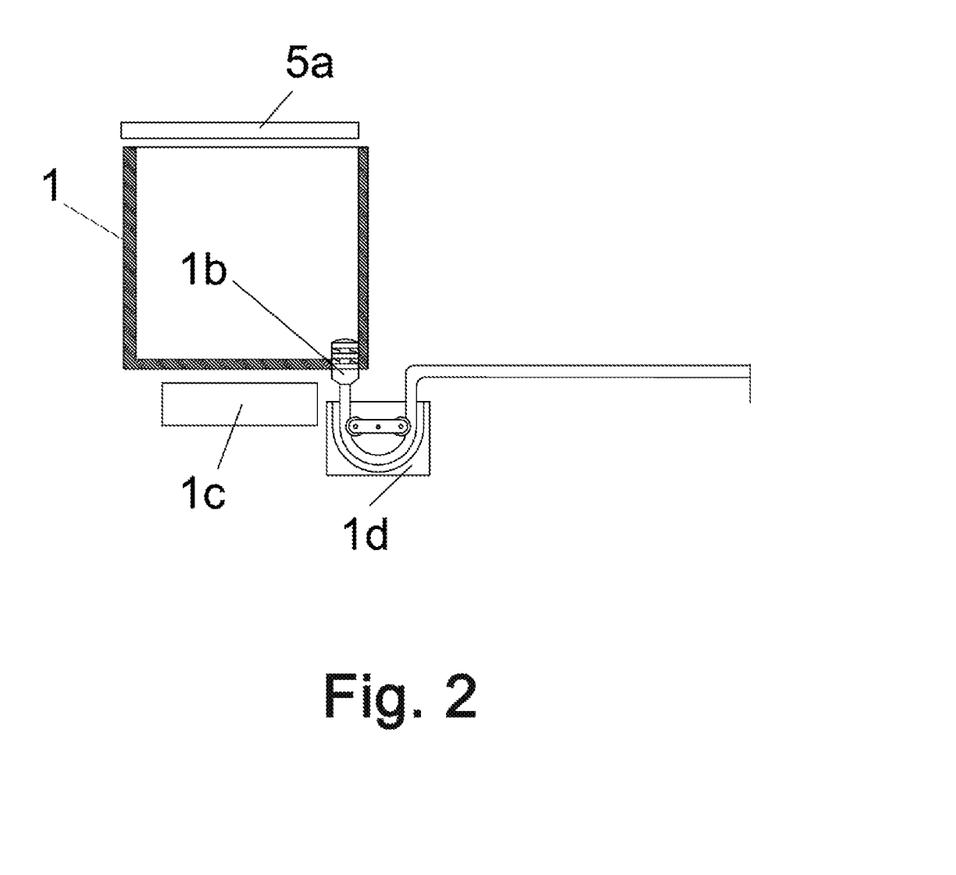
FIG. 2 is a detailed view of the first tank or input tank of the product to be spherified.

In order to perform mixing in the first tank -1- it is preferable to insert a plastics magnet (helix) for magnetic mixing in the initial containers (of water and of liquid to be spherified using a magnetic mixer -1c- in each case). This magnetic mixing is commonly used in laboratories.

The outlet of the first tank -1- for the liquid to be spherified has a spring valve -1b-. Although not shown in the figures, the outlet of the first tank -1- can be connected by means of a diffusion pump or a peristaltic pump -1d- in bypass with a pH sensor such that the liquid is returned to the input container via a control valve or three-way valve. This three-way valve will change when the pH is correct, to send the liquid to the formation tank -3-. In the example shown, the valve -1b- leads to a peristaltic pump -1d- which pushes the liquid towards a dripper -3d-. In some cases, the use of the pump may be forgone.

The second tank -2- comprises both a feeder screw -4c- for the alginate and a spring valve -2a- in the lowest part of the tank. The spring valve can be a spring valve that is commonly used in domestic coffee makers. The mixed water, once mixed, can be dispensed from the second tank -2- to the formation tank -3- by means of gravity by opening the spring valve -2a- leading to the water with alginate. Liquid can be dispensed into the formation tank -3- via a dripper -2c- or entry funnel.

The mixing in the water tank -2- can be carried out using a magnetic mixer -2b-.

In this way, the two mixed liquids are produced (water+alginate in the second tank -2- (second liquid) and product to be spherified+pH controllers+thickeners+calcium chloride in the tank -1- (first liquid)).

The second liquid (second tank -2-) is conveyed to the formation or spherification tank -3- which contains the helical worm screw -3b- arranged in such a way that the liquid forms a level -9- such that the plane that contains the level -9- forms an oblique angle (an angle other than 0°) with the axis of the worm screw -3b-.

The mixture of alginate and water with calcium chloride and liquid to be spherified allows spherical membranes having liquid in their interior (spherification) to be formed. The spheres will form when the first liquid or input liquid (pre-mixed with pH controllers, thickeners and calcium chloride in tank -1-) comes into contact with the second liquid (mixture of water+alginate) (in the spherification tank -3-).

It will be possible to produce small-sized spheres (known as "caviar") (dripping the liquid to be spherified directly into the formation tank -3- via the dripper -3d-), without the dispensing spoon or receiving component -3a- as an intermediary. It will also be possible to produce larger spheres (known as "ravioli") by dripping the liquid to be spherified into a dispensing spoon -3a-, and, once filled with liquid, said spoon will turn, coming into contact with the liquid in the spherification or formation tank -3- by lowering itself below the level -9- of said tank. The rotation of the dispensing spoon -3a- causes the formed sphere to leave the concave space by falling into a region in which it is pulled along by the vanes of the worm screw -3b-. The dispensing spoon -3a- in the example is arranged in parallel with the level -9- of the second liquid. It may stay fixed to the axis of the worm screw -3b- or even to the helical vane of the same.

The spherification apparatus will automatically introduce the product to be spherified (by means of a spoon or direct drops) into the bath that contains the water+alginate mixture (deposited on the inclined helicoid) and the spheres will have formed in approximately 180-210 seconds. The spheres will be extracted by means of rotation of the helical worm screw -3b- which will keep rotating at the speed needed to keep the spheres in the bath for 180-210 seconds while they are forming. This helical worm screw mechanism -3b- will prevent the spheres from sticking together while they are forming, as each turn of the screw provides a cavity for a new sphere.

If the user wants to produce smaller or "caviar" spheres, the drip will be carried out directly into the container that houses the helical worm screw. This drip can be controlled by the stepper motor of the peristaltic pump -1d-. The formed spheres will be collected and conveyed by the helical worm screw -3b- as far as the formation outlet -3c-, reaching the same once the necessary time has passed.

There are numerous possibilities that differ from the example shown, which are merely given as examples; the inlet nozzle -3d- can take any form. For example, it would be possible for the inlet nozzle to have a rotating spoon or a spoon with alternating movement that would receive the first liquid from the first tank -1- and would dispense or drop its contents into the liquid in the formation or spherification tank -3-. This dispensing spoon -3a- has a rotating movement such that once dispensed by the dripper system it will start to rotate until it frees the liquid to be spherified in the inlet nozzle via the dripper -3d-. In this case, the worm screw -3b- in the formation tank -3- may not have the receiving element or dispensing spoon -3a-.

The components of the embodiment shown in the drawings have been represented in a schematic and conceptual manner, not necessarily corresponding to their actual form or structure.

Although the invention has been set out and described with reference to embodiments thereof, it should be understood that these do not limit the invention, and that it is possible to alter many structural or other details that may prove obvious to persons skilled in the art after interpreting the subject matter disclosed in the present description, claims and drawings. Therefore, the scope of the present invention includes any variant or equivalent that could be considered covered by the broadest scope of the following claims.

The invention claimed is:

1. A device for spherification of a liquid, comprising:
   a spherification tank;
   a first storage tank of a first liquid;
   a second tank for storing a second liquid;
   a dripper or entry funnel for introducing the second liquid from the second tank into the spherification tank, and for controlling a level of the second liquid in the spherification tank;
   a first fluid dispenser for dispensing the first liquid coming from the first tank into the spherification tank;
   an extraction device for extracting spheres generated in the spherification tank as a result of the dispensation, wherein:
   the extraction device comprises a worm screw located in the spherification tank and a motor for rotating the worm screw, the worm screw is arranged at an angle to said level, wherein the worm screw comprises a spoon having a concave shape for receiving the first liquid into an interior of the spoon, wherein the spoon is arranged in parallel with the level of the second liquid when the spoon is aligned with a vertical axis of said first fluid dispenser of the first liquid, wherein the spoon is configured to turn over such that the first liquid received in the interior of the spoon leaves the interior of the spoon; and
   the first fluid dispenser dispenses the first liquid into the spherification tank at a first position and the dripper or entry funnel introduces the second fluid into the spherification tank at a second position, wherein the second position is proximate a portion of the angled worm screw higher than a portion of the angled worm screw proximate the first position.

2. The device according to claim 1, wherein the spoon is fixed to the worm screw, without possibility of movement with respect to the worm screw.

3. The device according to claim 2, wherein the spoon remains fixed to the central axis of the worm screw.

4. The device according to claim 1, further comprising:
   a dispensing pump for the first liquid,
   a cap located in the first tank having dispensing nozzles for dispensing calcium salts, thickeners and stabilisers,
   an alginate powder dispenser connected to the second tank.

5. The device according to claim 4, wherein the dispensing pump for the first liquid is located in an outlet conduit of the first tank.

6. The device according to claim 4, wherein the alginate powder dispenser comprises a hopper, a worm screw and a capacitance sensor.

7. The device according to claim 1, wherein a valve is located between the first tank and the spherification tank.

8. The device according to claim 1, wherein the first fluid dispenser comprises a dripper.

9. The device according to claim 1, wherein the spherification tank comprises an outlet at a third position, wherein the third position is proximate a portion of the angled worm screw higher than the portion of the angled worm screw proximate the second position.

* * * * *